United States Patent [19]

Bauer

[11] Patent Number: 5,546,846

[45] Date of Patent: Aug. 20, 1996

[54] VACUUM BRAKE POWER BOOSTER FOR AUTOMOTIVE VEHICLES

[75] Inventor: Jurgen Bauer, Wiesbaden, Germany

[73] Assignee: ITT Automotive Europe GmbH

[21] Appl. No.: 387,892

[22] Filed: Feb. 22, 1995

[30] Foreign Application Priority Data

Aug. 22, 1992 [DE] Germany ............... 42 27 879.1

[51] Int. Cl.⁶ ........................................... F15B 9/10
[52] U.S. Cl. ............................................. 91/376 R
[58] Field of Search ...................... 91/369.1, 369.2, 91/376 R

[56] References Cited

U.S. PATENT DOCUMENTS 4,598,548  7/1986  Wagner ................... 91/369.2
5,233,907  8/1993  Gautier et al. ........... 91/376 R

FOREIGN PATENT DOCUMENTS 3915219  11/1990  Germany .
241254  10/1986  Japan .................. 91/369.2

Primary Examiner—F. Daniel Lopez
Attorney, Agent, or Firm—Thomas N. Twomey; J. Gordon Lewis

[57] ABSTRACT

To optimize the ratio of forces which are caused during operation of a vacuum brake power booster, in particular the response force and the resetting force, according to the present invention, means are provided which permit applying the pneumatic pressure, which prevails in the ventilatable working chamber, to the side of the valve member of a control valve remote from the sealing seats of the control valve, the control valve controlling the pneumatic pressure differential between a vacuum and the atmospheric pressure.

9 Claims, 2 Drawing Sheets

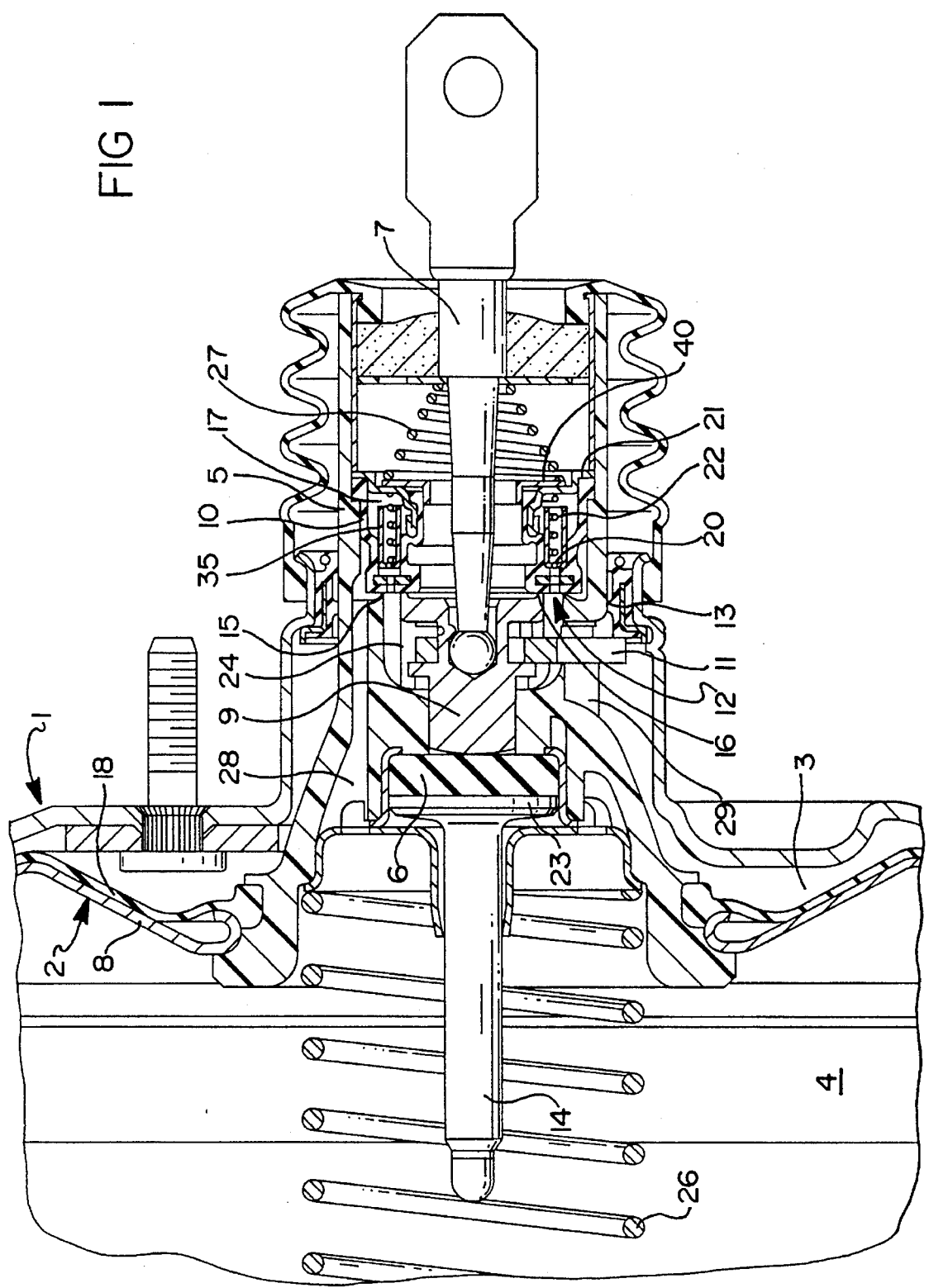

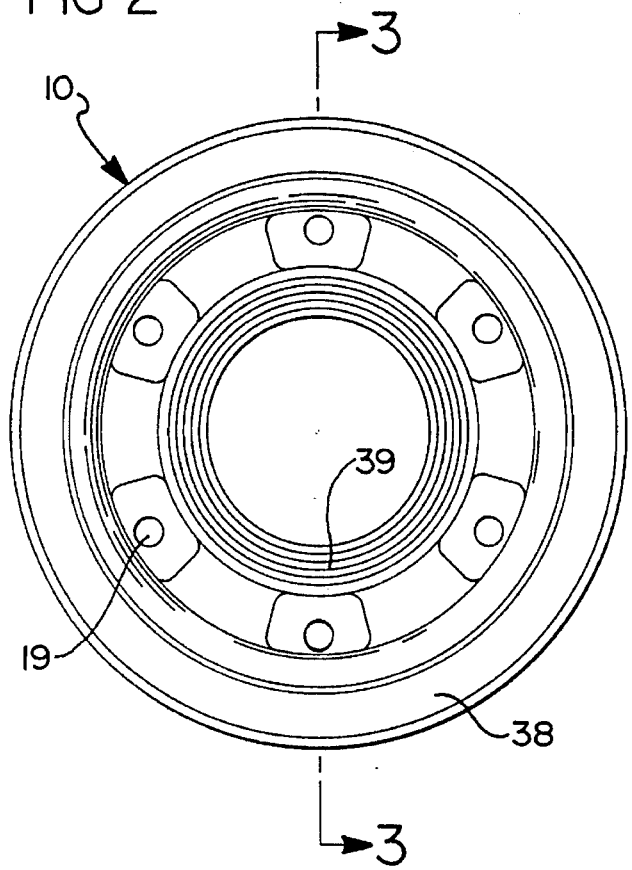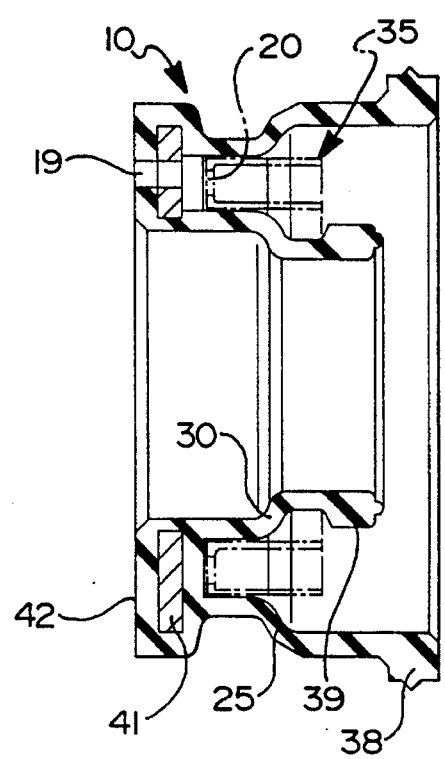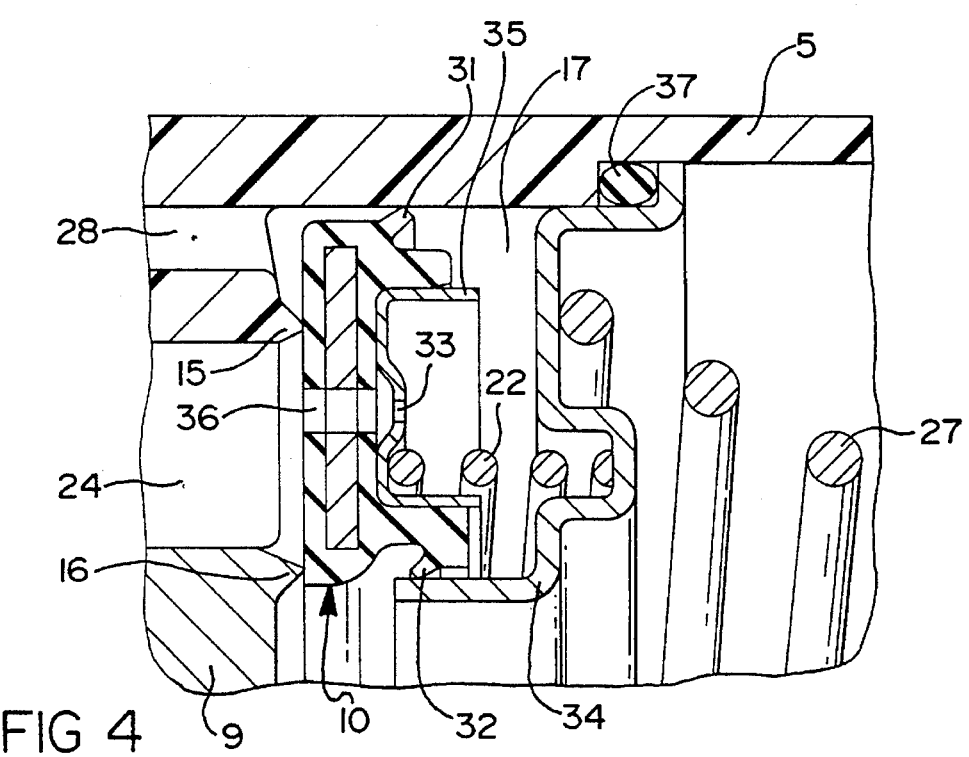

VACUUM BRAKE POWER BOOSTER FOR AUTOMOTIVE VEHICLES

TECHNICAL FIELD

The present invention relates to a vacuum brake power booster for automotive vehicles including a booster housing having its interior subdivided by a movable wall into a vacuum chamber and a power chamber, and a control valve which controls a pressure differential acting on the movable wall and comprises two concentrically arranged sealing seats and an elastically deformable valve member.

BACKGROUND OF THE INVENTION

A vacuum brake power booster of this type is disclosed in DE-OS 39 15 219, for example. To prevent the effective surface at the valve member, to which the pneumatic pressure differential is applied, from increasing by expansion during operation, an annular component is provided which embraces the valve member and limits the radial movability of the rolling fold of the valve member towards the outside.

The effect of a force component, which is caused during evacuation of the vacuum chamber due to the pressure differential between the vacuum pressure and the atmospheric pressure, on the above-mentioned effective surface on the valve member is disadvantageous, which force component acts in the actuating direction and tends to close the sealing seat (vacuum sealing seat) provided on the control housing. This force component must be overcome, in particular during the return movement of the movable wall, in order to open the vacuum sealing seat. Therefore, the spring, which biases the second (atmospheric) sealing seat in opposition to the actuating direction, has to be rated accordingly. However, the result of this measure is an increased response force.

Therefore, an objective of the present invention is to indicate measures which permit improving or optimizing the ratio between the resetting force, acting on the second sealing seat, and the response force of the vacuum brake power booster.

According to the present invention, this objective is achieved by a means which permits applying the pneumatic pressure, prevailing in the working chamber, to the side of the valve member remote from the sealing seats.

To specify the idea of the present invention, in a favorable aspect of the present invention, wherein the control valve is accommodated in a control housing in which the movable wall is incorporated, the valve member confines a pneumatic chamber in the control housing, to which the pneumatic pressure prevailing in the working chamber may be applied.

In still another aspect of the subject matter of the present invention, a particularly short flow path during evacuation and venting of the pneumatic chamber and a rapid change in pressure in the pneumatic chamber is achieved by the valve member having at least one passage proximate its sealing surface which forms a connection between an annular chamber, confined by the sealing seats and connected with the working chamber, and the pneumatic chamber.

The friction developing during movement of the valve member, according to another favorable aspect of the present invention, may be minimized by the valve member having a radially external and a radially internal rolling fold which, along with a retaining ring retaining the valve member in the control housing, confine the pneumatic chamber.

In another embodiment of the vacuum brake power booster according to the present invention, the overall axial length is shortened, and ease of assembly and manufacture is ensured, by the annularly shaped valve member having a radially external and a radially internal sealing lip which, along with a guide element arranged and sealed in the control housing, confine the pneumatic chamber.

In this arrangement, it is favorable that an annular reinforcing element is arranged on the side of the valve member remote from the sealing seats, and a valve spring bears against the reinforcing element and biases the valve member in the direction of the sealing seats. The reinforcing element, preferably, has a U-shaped cross-section and contains at least one opening opposite to the passage of the valve member.

In another variant, the assembly of the control unit is considerably simplified by the reinforcing element being positioned between the rolling folds. Further, this ensures a proper support of the radially internal rolling fold which permits a determined, desired roll-off diameter. To this end, the reinforcing element may have an L-shaped cross-section.

In still another advantageous variant of embodiment of the present invention, the pneumatic chamber is sealed by sealing beads which are respectively adjacent to the external and the internal rolling folds and in sealing abutment on the control housing or the retaining ring. The reliability in operation of the vacuum brake power booster according to the present invention is enhanced by this effective sealing.

Finally, it is of great significance for producing the desired magnitudes of the resetting force by means of the spring mentioned above that the diameter of the radially internal rolling fold is smaller than the diameter of the second sealing seat, or that it is at most as large as the diameter of the second sealing seat.

BRIEF DESCRIPTION OF THE DRAWINGS

FIG. 1 is a longitudinal cross-sectional view, partly broken off, of a vacuum brake power booster according to the present invention.

FIG. 2 is an axial, cross-sectional, enlarged, top view of the valve member of FIG. 1.

FIG. 3 is a cross-sectional, enlarged, side view of the valve member of FIG. 1.

FIG. 4 is a simplified view, on an enlarged scale, of the control unit of a second embodiment of the vacuum brake power booster according to the present invention.

DETAILED DESCRIPTION OF THE PREFERRED EMBODIMENT

The booster housing 1, shown only schematically, of the vacuum brake power booster according to the present invention, as shown in FIG. 1, is subdivided by an axially movable wall 2 into a working chamber 3 and a vacuum chamber 4. The axially movable wall 2 is formed of a diaphragm plate 8, deep drawn from a metal blank, and a flexible diaphragm 18 (not shown) which abuts on the diaphragm plate and acts as a rolling diaphragm to provide a sealing between the outside periphery of the diaphragm plate 8 and the booster housing 1.

A control valve 12, operable by an actuating rod 7, is accommodated in a control housing 5, which is guided and sealed in the booster housing 1 and in which the movable wall 2 is incorporated. The control valve has a first sealing seat 15, provided on the control housing 5, a second sealing seat 16, provided on a valve piston 9 which is connected with the actuating rod 7, and a valve member 10 which interacts with both sealing seats 15, 16 and is urged against the valve seats 15, 16 by a valve spring 22 which bears against a retaining ring 21. The working chamber 3 is connectible with the vacuum chamber 4 through a channel 28 which extends laterally in the control housing 5.

The brake force is transmitted to an actuating piston of a master cylinder, not shown, of the brake system (which is fitted to the vacuum-side end of the vacuum brake power booster) through an elastomeric reaction disc 6, abutting frontally on the control housing 5, and a push rod 14 having a head flange 23. The input force, which is introduced at the actuating rod 7, is transmitted to the reaction disc 6 by means of the valve piston 9.

A resetting spring 26 (shown schematically) which bears against a flange (not shown) on the vacuum-side end wall of the booster housing 1 retains the movable wall 2 in the initial position shown. Further, a second compression spring 27 is interposed between the actuating rod 7 and a prop ring 40, which abuts on the retaining ring 21 and secures the valve member 10 to the retaining ring 21. The force of the compression spring 27 biases the valve piston 9 or its valve seat 16 in relation to the valve member 10.

To connect the working chamber 3 with the atmosphere when the control valve 12 is operated, additionally, a roughly radially extending channel 29 is provided in the control housing 5. The return movement of the valve piston 9 at the end of a braking operation is confined by a transverse member 11 which, in the release position of the vacuum brake power booster illustrated in the drawing, bears against a sliding packing ring 13 which guides and seals the control housing 5 in the booster housing 1.

As can be seen in FIGS. 2 and 3, in particular, the valve member 10 has an annular sealing surface 42 which interacts with the two sealing seats 15, 16, is reinforced by a metal reinforcing disc 41 and includes several axial passages 19. On the side of the sealing surface 18 remote from the sealing seats 15, 16, there is a radially external first rolling fold 25 of large diameter and a radially internal second rolling fold 30 of small diameter, each of which pass over into a sealing bead 38, 39.

In the mounted condition of the valve member 10 in the control housing 5, the sealing beads 38, 39 are in sealing abutment on the inside wall of the valve member 10 or, rather, on the above-mentioned retaining ring 21 retaining the valve member 10. Thereby, a pneumatic chamber 17 is defined in the control housing 5. Preferably, an annular reinforcing element 35, U-shaped in cross-section, is interposed between the two rolling folds 25, 30, against which reinforcing element the valve spring 22 bears and which has a plurality of openings 20 opposite to the passages 19 of the valve member 10. The flow paths which are represented by the passages 19 and the openings 20 (but which are not identified in detail) connect the pneumatic chamber 17 with an annular chamber 24 which is confined by the sealing seats 15, 16 and into which the above-mentioned pneumatic channel 29 terminates. Thereby, the pneumatic chamber 17, which is provided on the side of the valve member 10 remote from the sealing surface 18, is permanently connected with the working chamber 3, and pressure balance is effected at the valve member 10.

In the second embodiment shown in FIG. 4, the valve member 10 has an annular design and includes a radially external first sealing lip 31, which is in sealing abutment on the wall of the control housing 5, and a radially internal second sealing lip 32, which interacts with a guide element 34 confining the pneumatic (pressure compensating) chamber 17. The guide element 34, which is sealed in relation to the control housing 5 by an O-ring 37, serves to support the piston-rod return spring 27, on the one hand, and to mount the valve spring 22, on the other hand. Similar to the embodiment of FIGS. 1 to 3, the pressure compensating chamber 17 is connected to the annular chamber 24 or the working chamber 3 (not shown) by means of passages 36 in the valve member 10 and openings 33, which are included in a reinforcing ring 35, U-shaped in cross-section and reinforcing the valve member 10, and opposite to the passages 36. The diameter of the radially internal sealing lip 32 has the same dimension as the diameter of the second sealing seat 16.

In the release position shown in FIG. 4, approximately the same amount of pressure prevails in the vacuum channel 28, the annular chamber 24 and the pneumatic pressure compensating chamber 17. As a result, the valve member 10 is pneumatically force balanced. The valve spring 22 generates the required press-on force to move the valve member 10 onto the second sealing seat 16.

Upon operation, the valve spring 22 and the force component, which is caused by the pneumatic pressure differential acting on the annular surface, generate the required press-on force to move the valve member 10 onto the first sealing seat 15, the annular surface being confined by the first sealing lip 31 and the first sealing seat 15.

To constitute a connection between the pneumatic chambers 3 and 4 and to open the first (vacuum) sealing seat 15 during a return movement of the movable wall 2, the second (piston-rod return) spring 27 acts in opposition to the spring force of the valve spring 22 and the atmospheric pressure acting on the second sealing seat 16. The surplus of the force which must be generated by the spring 27 is the above-mentioned resetting force.

Thus, the present invention permits reducing the difference between the response force of the vacuum brake power booster and the resetting force, which acts on the valve piston, to the effect that, with a constant response force, the resetting force may be increased or, with a constant resetting force, the response force may be reduced, with the result that the hysteresis of the brake power booster according to the present invention is improved.

I claim:

1. A vacuum brake power booster for automotive vehicles, comprising:

a booster housing having its interior subdivided by a movable wall into a vacuum chamber and a working chamber, and a control valve which controls a pressure differential acting on the movable wall and comprises two concentrically arranged sealing seats and an elastically deformable valve member, means for applying a pneumatic pressure, prevailing in the working chamber, to the side of the valve member remote from the sealing seats, wherein the valve member has a radially external and a radially internal rolling fold which, along with its sealing surface and a retaining ring retaining the valve member in a control housing, confine a pneumatic chamber, and further including an annular reinforcing element and a valve spring, wherein said annular reinforcing element is arranged on the side of the valve member remote from the sealing seats and said valve spring bears against the reinforcing element and biases the valve member in the direction toward the sealing seats wherein the reinforcing element has a U-shaped cross-section and contains at least one opening opposite to the passage of the valve member.

2. A vacuum brake power booster as claimed in claim 1, wherein the control valve is arranged in a control housing in which the movable wall is incorporated, and wherein the valve member confines a pneumatic chamber in the control housing, to which the pneumatic pressure prevailing in the working chamber may be applied.

3. A vacuum brake power booster as claimed in claim 2, wherein the valve member has at least one passage proximate its sealing surface which forms a connection between an annular chamber, confined by the sealing seats and connected with the working chamber, and the pneumatic chamber.

4. A vacuum brake power booster as claimed in claim 2, wherein the elastically deformable valve member has a radially external and a radially internal sealing lip which, along with its sealing surface and a guide element arranged and sealed in the control housing, confine the pneumatic chamber.

5. A vacuum brake power booster as claimed in claim 1, wherein the annular reinforcing element is positioned between the rolling folds.

6. A vacuum brake power booster as claimed in claim 1, wherein the pneumatic chamber is sealed by sealing beads, which are respectively adjacent to the external and the internal rolling folds and in sealing abutment on the control housing or the retaining ring, respectively.

7. A vacuum brake power booster as claimed in claim 1, wherein a diameter of the radially internal rolling fold is smaller than or equal to a diameter of the second sealing seat.

8. A vacuum brake power booster for automotive vehicles, comprising:

a booster housing having its interior subdivided by a movable wall into a vacuum chamber and a working chamber, and a control valve which controls a pressure differential acting on the movable wall and includes two concentrically arranged sealing seats and an elastically deformable valve member, means for applying a pneumatic pressure, prevailing in the working chamber, to the side of the valve member remote from the sealing seats, wherein the valve member has a radially external and a radially internal rolling fold which, along with its sealing surfaces, and a retaining ring retaining the valve member in a control housing, confine a pneumatic chamber, and wherein the pneumatic chamber is sealed by sealing beads, which are respectively adjacent to the external and internal rolling folds and in sealing abutment on the control housing or the retaining ring, respectively.

9. A vacuum brake power booster for automotive vehicles, comprising:

a booster housing having its interior subdivided by a movable wall into a vacuum chamber and a working chamber, and a control valve which controls a pressure differential acting on the movable wall and includes two concentrically arranged sealing seats and an elastically deformable valve member, means for applying a pneumatic pressure, prevailing in the working chamber, to the side of the valve member remote from the sealing seats, wherein the valve member has a radially external and a radially internal rolling fold which, along with its sealing surfaces, and a retaining ring retaining the valve member in a control housing, confine a pneumatic chamber, and wherein a diameter of the radially internal rolling fold is smaller than or equal to a diameter of the second sealing seat.

* * * * *